United States Patent
Selgas et al.

(10) Patent No.: US 9,767,299 B2
(45) Date of Patent: Sep. 19, 2017

(54) SECURE CLOUD DATA SHARING

(71) Applicant: MyMail Technology, LLC, San Angelo, TX (US)

(72) Inventors: Thomas Drennan Selgas, Athens, TX (US); John D. Heintz, Austin, TX (US)

(73) Assignee: MyMail Technology, LLC, Dallas, TX (US)

( * ) Notice: Subject to any disclaimer, the term of this patent is extended or adjusted under 35 U.S.C. 154(b) by 0 days.

(21) Appl. No.: 14/203,821

(22) Filed: Mar. 11, 2014

(65) Prior Publication Data

US 2014/0281520 A1    Sep. 18, 2014

Related U.S. Application Data

(60) Provisional application No. 61/786,828, filed on Mar. 15, 2013.

(51) Int. Cl.
*H04L 29/06* (2006.01)
*H04L 9/30* (2006.01)
(Continued)

(52) U.S. Cl.
CPC ........ *G06F 21/6209* (2013.01); *G06F 21/602* (2013.01); *G06F 21/6218* (2013.01);
(Continued)

(58) Field of Classification Search
CPC ............. H04L 63/0428; H04L 2209/60; H04L 63/0442; H04L 9/0825; H04L 9/0854;
(Continued)

(56) References Cited

U.S. PATENT DOCUMENTS 5,204,966 A    4/1993    Wittenberg et al.
5,432,934 A    7/1995    Levin et al.
(Continued)

FOREIGN PATENT DOCUMENTS

EP    2544117 A1 *    1/2013    ......... G06F 21/6218

OTHER PUBLICATIONS

Menezes, Alfred J. et al. Handbook of Applied Cryptography, 1997 CRC Press, LLC, pp. 31-32.*
(Continued)

*Primary Examiner* — Michael Simitoski
(74) *Attorney, Agent, or Firm* — Gardere Wynne Sewell LLP

(57) ABSTRACT

A system and method for sharing an encrypted file stored on a cloud server is disclosed. In certain embodiments, the method includes generating a file key associated with the encrypted file stored in the cloud server; generating a share message, the share message including the generated file key and identifying a recipient user and the encrypted file stored in the cloud server; encrypting the file key using an identification key of the recipient user to generate a share key; storing the share key in the cloud server; notifying the recipient user of the encrypted file and share key stored on the cloud server; retrieving the encrypted file and the share key from the cloud server; decrypting the share key using the identification key of the recipient user to reconstruct the file key; and using the reconstructed file key to decrypt the encrypted file.

12 Claims, 3 Drawing Sheets

(51) Int. Cl.
  *G06F 21/62* (2013.01)
  *H04L 9/08* (2006.01)
  *G06F 21/60* (2013.01)
  *G06Q 10/10* (2012.01)
  *G06F 17/30* (2006.01)

(52) U.S. Cl.
  CPC ....... *G06F 21/6272* (2013.01); *G06Q 10/101* (2013.01); *H04L 9/0825* (2013.01); *H04L 63/0428* (2013.01); *H04L 63/0442* (2013.01); *H04L 63/105* (2013.01); *G06F 2221/2107* (2013.01)

(58) Field of Classification Search
  CPC ..... H04L 67/1097; H04L 9/08; H04L 9/0822; H04L 63/105; G06F 21/6218; G06F 21/6209; G06F 2221/2107; G06F 21/602; G06F 21/10; G06F 21/6272; G06F 21/645; G06Q 10/101
  See application file for complete search history.

(56) References Cited

U.S. PATENT DOCUMENTS

| | | | | |
|---|---|---|---|---|
| 5,497,421 | A | 3/1996 | Kaufman et al. | |
| 5,581,700 | A | 12/1996 | Witte | |
| 5,673,316 | A * | 9/1997 | Auerbach et al. | 705/51 |
| 5,708,777 | A | 1/1998 | Sloan et al. | |
| 5,719,941 | A | 2/1998 | Swift et al. | |
| 5,748,735 | A | 5/1998 | Ganesan | |
| 5,850,443 | A | 12/1998 | Van Oorschot et al. | |
| 5,941,947 | A | 8/1999 | Brown et al. | |
| 6,009,173 | A | 12/1999 | Sumner | |
| 6,061,448 | A | 5/2000 | Smith et al. | |
| 6,151,609 | A | 11/2000 | Truong | |
| 6,161,139 | A | 12/2000 | Win et al. | |
| 6,182,142 | B1 | 1/2001 | Win et al. | |
| 6,223,284 | B1 | 4/2001 | Novoa et al. | |
| 6,370,250 | B1 | 4/2002 | Stein | |
| 6,408,336 | B1 | 6/2002 | Schneider et al. | |
| 6,412,070 | B1 | 6/2002 | Van Dyke et al. | |
| 6,453,353 | B1 | 9/2002 | Win et al. | |
| 6,533,583 | B1 | 3/2003 | Sportelli | |
| 6,571,290 | B2 | 5/2003 | Selgas et al. | |
| 6,625,734 | B1 * | 9/2003 | Marvit et al. | 726/28 |
| 6,636,973 | B1 | 10/2003 | Novoa et al. | |
| 6,834,112 | B1 | 12/2004 | Brickell | |
| 6,871,286 | B1 | 3/2005 | Cagle et al. | |
| 6,986,049 | B2 | 1/2006 | Delany | |
| 7,039,949 | B2 | 5/2006 | Cartmell et al. | |
| 7,051,077 | B2 | 5/2006 | Lin | |
| 7,149,893 | B1 * | 12/2006 | Leonard et al. | 713/154 |
| 7,167,981 | B2 * | 1/2007 | Tanimoto | 713/163 |
| 7,185,192 | B1 | 2/2007 | Kahn | |
| 7,213,158 | B2 | 5/2007 | Bantz et al. | |
| 7,228,437 | B2 | 6/2007 | Spagna et al. | |
| 7,249,261 | B2 | 7/2007 | Charbonneau | |
| 7,272,231 | B2 * | 9/2007 | Jonas | H04L 9/0863 380/259 |
| 7,299,502 | B2 * | 11/2007 | Schmeling et al. | 726/29 |
| 7,308,580 | B2 | 12/2007 | Nelson et al. | |
| 7,320,076 | B2 | 1/2008 | Caronni | |
| 7,330,971 | B1 | 2/2008 | Kukreja et al. | |
| 7,346,930 | B1 | 3/2008 | Boydstun et al. | |
| 7,487,548 | B1 | 2/2009 | Conover | |
| 7,506,010 | B2 | 3/2009 | Kulkarni et al. | |
| 7,680,819 | B1 | 3/2010 | Mellmer et al. | |
| 7,693,285 | B2 | 4/2010 | Curry | |
| 7,761,404 | B2 | 7/2010 | Chen et al. | |
| 7,765,298 | B2 | 7/2010 | Villavicencio | |
| 7,865,373 | B2 | 1/2011 | Punzak et al. | |
| 7,869,591 | B1 * | 1/2011 | Nagel et al. | 380/28 |
| 7,975,292 | B2 | 7/2011 | Corella | |
| 7,996,683 | B2 | 8/2011 | Lyseggen et al. | |
| 8,019,085 | B2 | 9/2011 | Adams et al. | |
| 8,127,149 | B1 | 2/2012 | Nachenberg | |
| 8,151,112 | B2 | 4/2012 | Lin | |
| 8,281,125 | B1 | 10/2012 | Briceno et al. | |
| 8,296,827 | B2 * | 10/2012 | Paganetti | G06F 21/31 726/5 |
| 8,379,857 | B1 * | 2/2013 | Zheng | 380/255 |
| 8,379,867 | B2 | 2/2013 | Selgas et al. | |
| 8,396,933 | B2 * | 3/2013 | Patterson | 709/206 |
| 8,549,317 | B2 | 10/2013 | Funayama | |
| 8,583,911 | B1 | 11/2013 | Miller | 713/150 |
| 8,601,263 | B1 * | 12/2013 | Shankar et al. | 713/166 |
| 8,625,802 | B2 | 1/2014 | Parann-Nissany | |
| 8,649,515 | B1 * | 2/2014 | Zhao et al. | 380/202 |
| 8,707,034 | B1 * | 4/2014 | Ryan | 713/165 |
| 8,737,614 | B1 * | 5/2014 | Mulligan | 380/243 |
| 8,737,624 | B2 | 5/2014 | Selgas et al. | |
| 2001/0055396 | A1 * | 12/2001 | Jevans | 380/282 |
| 2002/0007453 | A1 * | 1/2002 | Nemovicher | 713/155 |
| 2002/0095499 | A1 | 7/2002 | Barnett et al. | |
| 2002/0129238 | A1 | 9/2002 | Toh et al. | |
| 2003/0172262 | A1 * | 9/2003 | Curry | 713/156 |
| 2004/0078603 | A1 | 4/2004 | Ogura et al. | |
| 2004/0091114 | A1 | 5/2004 | Carter et al. | |
| 2004/0103324 | A1 | 5/2004 | Band | |
| 2004/0125957 | A1 * | 7/2004 | Rauber et al. | 380/259 |
| 2004/0146164 | A1 * | 7/2004 | Jonas | H04L 9/0863 380/284 |
| 2005/0027713 | A1 | 2/2005 | Cameron et al. | |
| 2005/0204030 | A1 | 9/2005 | Koch et al. | |
| 2006/0026682 | A1 | 2/2006 | Zakas | |
| 2006/0075258 | A1 * | 4/2006 | Adamson et al. | 713/189 |
| 2006/0259960 | A1 | 11/2006 | Kondo | |
| 2007/0033657 | A1 | 2/2007 | Murakawa | |
| 2007/0250920 | A1 | 10/2007 | Lindsay | |
| 2007/0255943 | A1 | 11/2007 | Kern et al. | |
| 2007/0282951 | A1 | 12/2007 | Selimis et al. | |
| 2008/0065878 | A1 | 3/2008 | Hutson et al. | |
| 2008/0148067 | A1 * | 6/2008 | Sitrick et al. | 713/193 |
| 2008/0162646 | A1 * | 7/2008 | Pizano et al. | 709/206 |
| 2008/0313730 | A1 | 12/2008 | Iftimie et al. | |
| 2008/0313731 | A1 | 12/2008 | Iftimie et al. | |
| 2009/0064297 | A1 | 3/2009 | Selgas et al. | |
| 2009/0075630 | A1 * | 3/2009 | McLean | 455/411 |
| 2009/0077136 | A1 | 3/2009 | Igawa et al. | |
| 2009/0080650 | A1 | 3/2009 | Selgas et al. | |
| 2009/0100529 | A1 | 4/2009 | Livnat et al. | |
| 2009/0158037 | A1 | 6/2009 | Lee et al. | |
| 2009/0198997 | A1 * | 8/2009 | Yeap et al. | 713/155 |
| 2009/0241167 | A1 | 9/2009 | Moore | |
| 2009/0259588 | A1 | 10/2009 | Lindsay | |
| 2009/0300351 | A1 | 12/2009 | Lei et al. | |
| 2010/0146268 | A1 | 6/2010 | Van Dorsselaer et al. | |
| 2010/0161759 | A1 | 6/2010 | Brand | |
| 2010/0169948 | A1 | 7/2010 | Budko et al. | |
| 2010/0217987 | A1 * | 8/2010 | Shevade | 713/175 |
| 2010/0257372 | A1 | 10/2010 | Seifert | |
| 2010/0293147 | A1 | 11/2010 | Snow et al. | |
| 2010/0318782 | A1 | 12/2010 | Auradkar et al. | |
| 2010/0333116 | A1 | 12/2010 | Prahlad et al. | |
| 2011/0238985 | A1 * | 9/2011 | Sovio et al. | 713/168 |
| 2011/0264906 | A1 * | 10/2011 | Pourzandi et al. | 713/153 |
| 2011/0289310 | A1 | 11/2011 | Selgas et al. | |
| 2012/0117171 | A1 * | 5/2012 | Patterson | 709/206 |
| 2012/0317414 | A1 * | 12/2012 | Glover | 713/165 |
| 2013/0007464 | A1 * | 1/2013 | Madden | 713/179 |
| 2013/0073854 | A1 | 3/2013 | Patti et al. | |
| 2013/0114812 | A1 * | 5/2013 | Gidwani | 380/255 |
| 2013/0156184 | A1 | 6/2013 | Selgas et al. | |
| 2013/0191629 | A1 * | 7/2013 | Treinen et al. | 713/153 |
| 2013/0254536 | A1 * | 9/2013 | Glover | 713/165 |
| 2013/0254537 | A1 * | 9/2013 | Bogorad | 713/165 |
| 2013/0263240 | A1 | 10/2013 | Moskovitch | |
| 2013/0283060 | A1 * | 10/2013 | Kulkarni | G06F 21/6218 713/189 |
| 2013/0305039 | A1 * | 11/2013 | Gauda | 713/153 |
| 2013/0318347 | A1 * | 11/2013 | Moffat | 713/168 |
| 2014/0006773 | A1 * | 1/2014 | Chazalet | H04L 63/0428 713/150 |

(56) References Cited

U.S. PATENT DOCUMENTS

| | | | |
|---|---|---|---|
| 2014/0140508 A1* | 5/2014 | Kamath | H04L 9/0822 380/255 |
| 2014/0215210 A1* | 7/2014 | Wang et al. | 713/165 |
| 2015/0113279 A1* | 4/2015 | Andersen et al. | 713/171 |

OTHER PUBLICATIONS

Zhao, Gansen, et al. "Trusted data sharing over untrusted cloud storage providers." Cloud Computing Technology and Science (CloudCom), 2010 IEEE Second International Conference on. IEEE, 2010.*

U.S. Appl. No. 12/201,150—Response to Non-Final Office Action, dated Aug. 26, 2014.

U.S. Appl. No. 12/201,150—Non-Final Office Action, dated Feb. 26, 2014.

U.S. Appl. No. 12/201,150—Request for Continued Examination (RCE), dated Dec. 5, 2013.

U.S. Appl. No. 12/201,150—Response to Final Office Action, dated Dec. 5, 2013.

U.S. Appl. No. 12/201,150—Final Office Action, dated Jun. 7, 2013.

U.S. Appl. No. 12/201,150—Response to Non-Final Office Action, dated Feb. 25, 2013.

U.S. Appl. No. 12/201,150—Non-Final Office Action, dated Nov. 23, 2012.

U.S. Appl. No. 12/201,150—Response to Office Action, dated Aug. 1, 2012.

U.S. Appl. No. 12/201,150—Non-Final Office Action, dated Feb. 14, 2012.

U.S. Appl. No. 12/201,150—Notice of Panel Decision from Pre-Appeal Brief Review, dated Oct. 18, 2011.

U.S. Appl. No. 12/201,150—Pre-Appeal Brief Request for Review, dated Aug. 31, 2011.

U.S. Appl. No. 12/201,150—Notice of Appeal, dated Aug. 31, 2011.

U.S. Appl. No. 12/201,150—Final Office Action, dated Apr. 19, 2011.

U.S. Appl. No. 12/201,150—Response to Office Action, dated Jan. 31, 2011.

U.S. Appl. No. 12/201,150—Interview Summary, dated Dec. 14, 2010.

U.S. Appl. No. 12/201,150—Non-Final Office Action, dated Aug. 30, 2010.

U.S. Appl. No. 13/112,931—Notice of Abandonment, dated Jan. 6, 2014.

U.S. Appl. No. 13/112,931—Final Office Action dated May 15, 2013.

U.S. Appl. No. 13/112,931—Response to Non-Final Office Action, dated Mar. 4, 2013.

U.S. Appl. No. 13/112,931—Non-Final Office Action dated Nov. 2, 2012.

Ala-Luukko Sami, Mobility Management in IEETF and GPRS Specifications, Helsinki University of Technology, May 15, 2000.

Proofpoint; Encryption Made Easy: The Advantages of Identity Based Encryption:; Proofpoint, Inc., Sunnyvale, California; 2005.

Wong, M. et al; RFC 4408—Sender Policy Framework (SPF) for Authorizing Use of Domains in E-Mail, Version 1:; Network Working Group, the Internet Society; Apr. 2006.

Microsoft; "Microsoft Exchange Hosted Encryption" Data sheet; Microsoft Corp.; 2006; http://www.microsoft.com/exchange/services.

Allman et al.; "RFC 4870—Domain Keys Identified Mail (DKIM) Signatures"; Network Working Group, IETF Trust; May 2007.

Microsoft; "Sender Reputation, Microsoft TechNet, Exchange 2007"; Microsoft Corp. 2008.

Schneier, Applied Cryptography, 1996, John Willey & Sons, 2nd Edition, pp. 179-180.

U.S. Appl. No. 12/201,150—Non-Final Office Action, dated Jun. 17, 2015.

U.S. Appl. No. 12/201,150—Response to Final Office Action, dated Jan. 11, 2017.

U.S. Appl. No. 12/201,150—Final Office Action, dated Jul. 14, 2016.

U.S. Appl. No. 12/201,150—Response to Non-Final Office Action, dated Dec. 17, 2015.

U.S. Appl. No. 12/201,150—Non-Final Office Action, dated Mar. 21, 2017.

* cited by examiner

SECURE CLOUD DATA SHARING

CROSS-REFERENCE TO RELATED APPLICATIONS

Pursuant to 35 U.S.C. §119(e), this application claims priority from, and hereby incorporates by reference for all purposes, U.S. Provisional Patent Application Ser. No. 61/786,828, entitled "Secure Cloud Data Sharing," filed Mar. 15, 2013, and naming Thomas D. Selgas and John D. Heintz as inventors.

FIELD

The present disclosure relates generally to a method for sharing encrypted data stored in a cloud-based storage system.

BACKGROUND

The statements in this section merely provide background information related to the present disclosure and may not constitute prior art.

In cloud computing, a cloud may be a computer server or a collection of computer servers that provide file storage services. Typically, a user obtains cloud file storage services from a third party that owns and operates the cloud. Third party cloud storage may be desirable because it frees the user from having to maintain file storage servers. A user may store files on and retrieve files from the cloud through a computer network such as, for example, the Internet. Various cloud-based storage services typically use shared key solutions to enable file sharing and other access functionality through the cloud. However, these solutions, which implement public key infrastructure, have several disadvantages including complex infrastructure maintenance that generally involves a high level of technical competency.

SUMMARY

In one embodiment, the present disclosure provides a method for sharing an encrypted file stored in a cloud server, the method comprising: generating a file key associated with the encrypted file stored in the cloud server; encrypting the file key using a symmetric key to generate a share key; storing the share key in the cloud server; retrieving the encrypted file and the share key from the cloud server; decrypting the share key using the symmetric key to reconstruct the file key; and using the reconstructed file key to decrypt the encrypted file.

In another embodiment, the present disclosure provides a method for sharing an encrypted file stored in a cloud server, the method comprising: generating a file key associated with the encrypted file stored in the cloud server; encrypting the file key using a public key of an asymmetric key pair to generate a share key; storing the share key in the cloud server; retrieving the encrypted file and the share key from the cloud server; decrypting the share key using a private key of the asymmetric key pair to reconstruct the file key; and using the reconstructed file key to decrypt the encrypted file.

In yet another embodiment, the present disclosure provides a method for sharing an encrypted file stored in a cloud server, the method comprising: generating a file key associated with the encrypted file stored in the cloud server; generating a share message, the share message including the generated file key and identifying at least a recipient user and the encrypted file stored in the cloud server; encrypting the file key using an identification key of the recipient user, which can be either a symmetric key of the recipient user or the public key of a public/private asymmetric key pair of the recipient user, to generate a share key; storing the share key in the cloud server; notifying the recipient user of at least one of the encrypted file and shared key stored in the cloud server; retrieving the encrypted file and the share key from the cloud server; decrypting the share key using the identification key of the recipient user, which is either the symmetric key of the recipient user or the private key of the public/private asymmetric key pair of the recipient user, to reconstruct the file key; and using the reconstructed file key to decrypt the encrypted file.

Further embodiments and apparatuses, including other areas of applicability, will become apparent from the description provided herein. It should be understood that the description and specific examples are intended for purposes of illustration only and are not intended to limit the scope of the present disclosure in any manner.

BRIEF DESCRIPTION OF THE DRAWINGS

For a more complete understanding of various embodiments of the present invention and the advantages thereof, reference is now made to the following brief description, taken in connection with the accompanying drawings and detailed description, wherein like reference numerals represent like parts, and in which.

DETAILED DESCRIPTION OF THE DRAWINGS

In the following detailed description, numerous specific details are set forth to provide a thorough understanding of the present disclosure. However, those skilled in the art will appreciate that the present disclosure may be practiced, in some instances, without such specific details. In other instances, well-known elements have been illustrated in schematic or block diagram form in order not to obscure the present disclosure in unnecessary detail. Additionally, for the most part, specific details, and the like, have been omitted inasmuch as such details are not considered necessary to obtain a complete understanding of the present disclosure, and are considered to be within the understanding of persons of ordinary skill in the relevant art.

It is further noted that, unless indicated otherwise, all functions described herein may be performed in hardware or as software instructions for enabling a computer to perform predetermined operations, where the software instructions are embodied on a computer readable storage medium, such as RAM, a hard drive, flash memory or other type of computer readable storage medium known to a person of ordinary skill in the art. In certain embodiments, the predetermined operations of the computer are performed by a processor such as a computer or an electronic data processor in accordance with code such as computer program code, software, firmware, and, in some embodiments, integrated circuitry that is coded to perform such functions. Furthermore, it should be understood that various operations described herein as being performed by a user may be operations manually performed by the user, or may be automated processes performed either with or without instruction provided by the user.

Figure 1A:
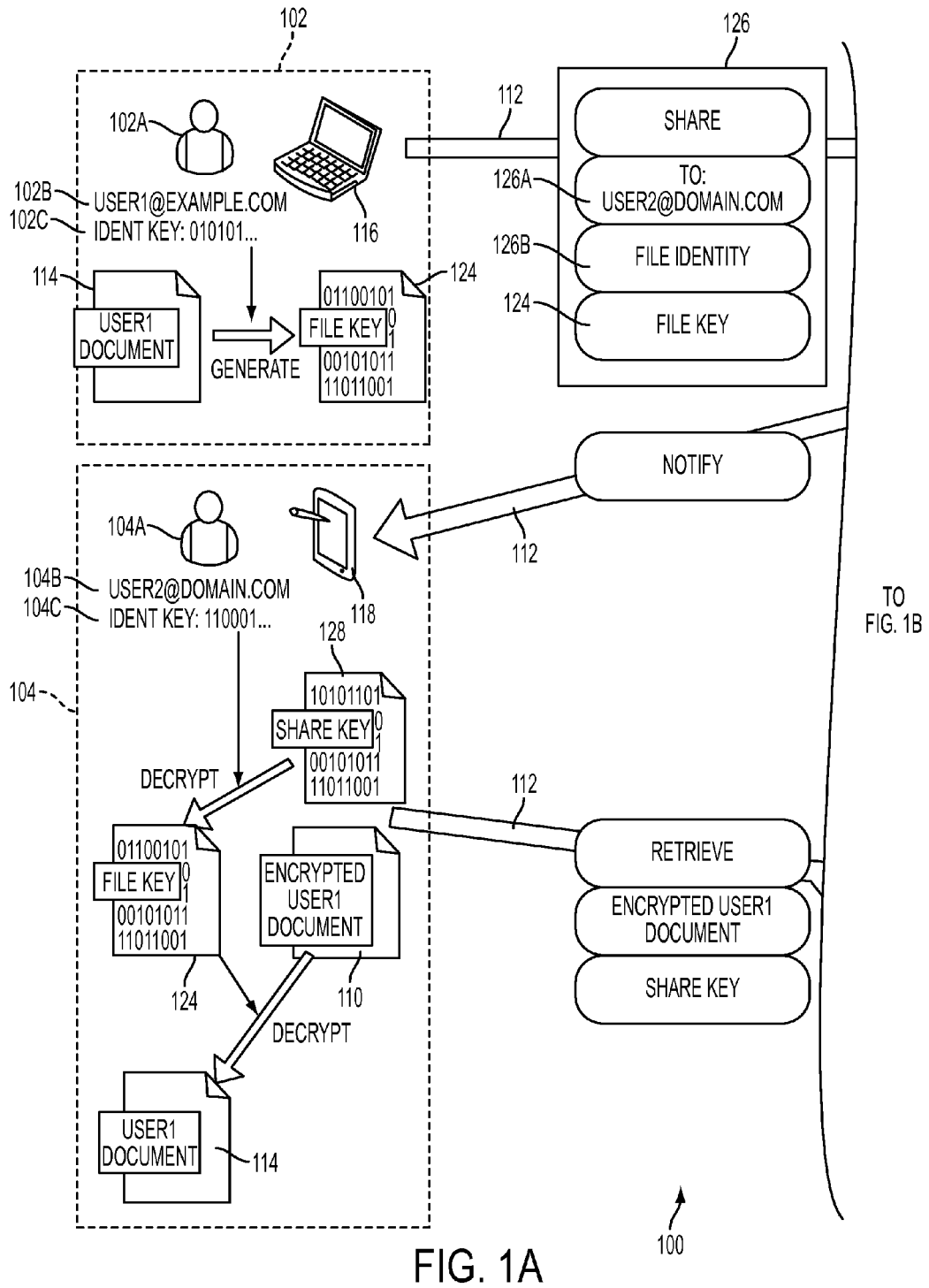
FIGS. 1A and 1B illustrate an example system architecture capable of implementing the disclosed method for sharing data stored in a network storage system.
Figure 1B:
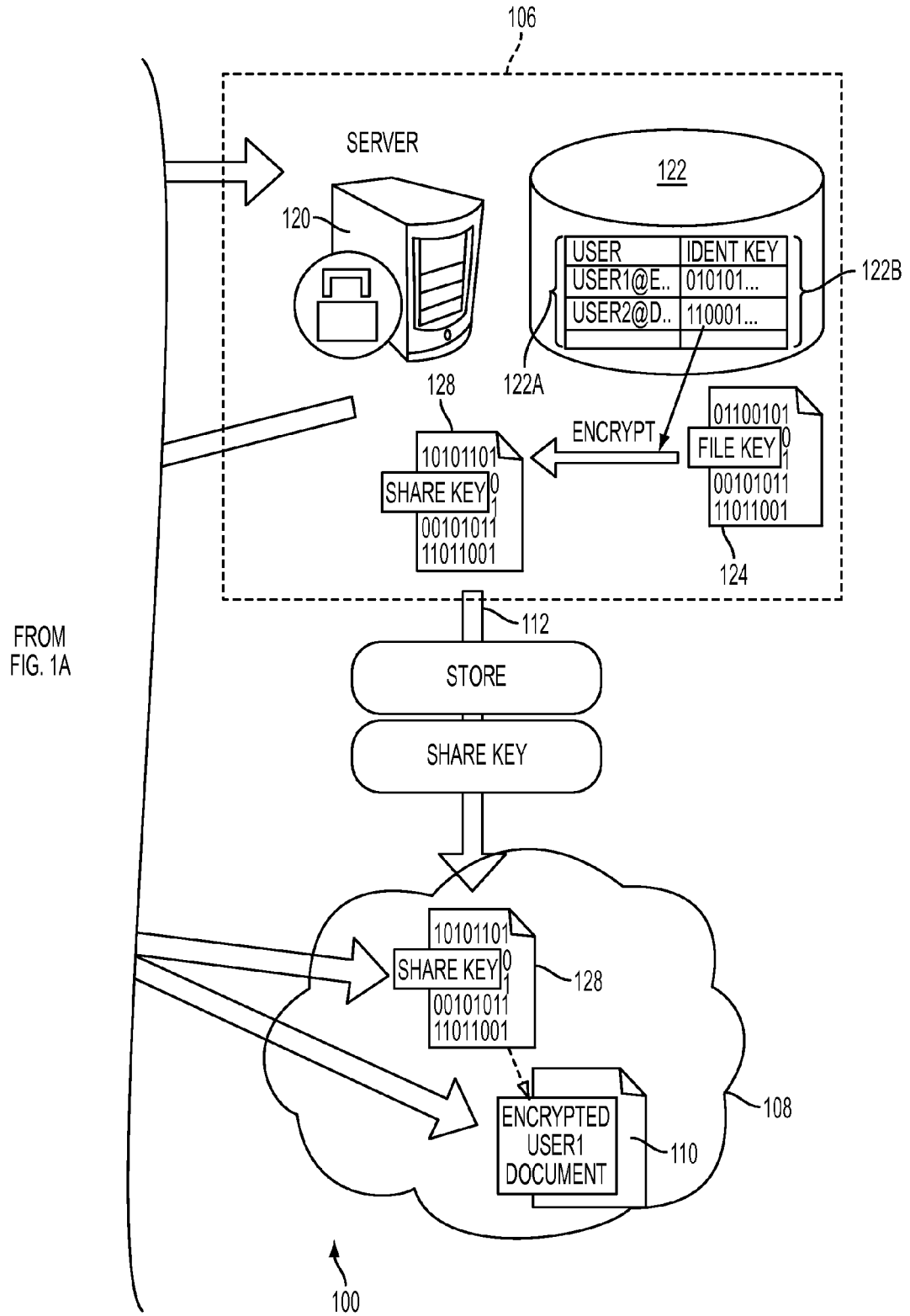

Referring now to FIGS. 1A and 1B, there is presented an example embodiment of a system architecture 100 capable of securely sharing data stored in a network storage system such as, for example, a cloud-based storage system or other such architecture. In some embodiments, the system 100 may include a first user node 102, a second user node 104, and a network server 106, wherein each may comprise one or more computers capable of executing computer instructions embodied on computer readable storage medium.

The first user node 102 provides a user interface, whereby a first user 102A may interact with various components of the system 100 via a first user device 116 such as, for example, a computer, mobile device, smart phone, or any other device capable of interfacing with the system 100. The second user node 104 provides a user interface, whereby a second user 104A may interact with various components of the system 100 via a second user device 118 such as, for example, a computer, mobile device, smart phone, or any other device capable of interfacing with the system 100.

In some embodiments, each user having access to the system 100 has a unique user identifier (e.g., email address, user name, user identification number, etc.) and private identification key. For example, as shown in FIG. 1A, the first user 102A has a first user identifier 102B and a first user private identification key 102C; the second user 104A has a second user identifier 104B and a second user private identification key 104C. In some embodiments, the user identifiers may be either private or known to system users. To ensure a high level of privacy/security, each user's private identification key is generally intended to be private and known only by the individual user and, in some embodiments, by system administrators or similar personnel having higher access permissions. However, in some embodiments, a user's private identification key may comprise at least a portion of a public key of an asymmetric key pair.

The network server 106 includes a computer processor 120 and database 122, for interfacing with the system 100, performing various tasks, and storing information such as a listing 122A of user identifiers and a listing 122B of corresponding private identification keys. It should be appreciated that, although the network server 106 of FIG. 1B is illustrated remote from both the first user node 102 and the second user node 104, the network server 106 may, in some embodiments, reside at the first user node 102 or the second user node 104. It should also be understood that the computer processor 120 and database 122 are illustrated in FIG. 1B as discrete components for the sake of clarity, and are not required to be separate components. However, in some embodiments, the computer processor 120 and database 122 may be separate and disposed at different locations. For example, in some embodiments, the computer processor 120 may be housed at the first user node 102 and the database 122 may be housed at the second user node 104.

The system 100 also includes a cloud server 108 capable of providing a network storage system for storing data. The data stored on the cloud server 108 is typically encrypted, and may be accessed by system users (e.g., the first user 102A and second user 104A) having proper credentials and access rights. The first user node 102, second user node 104, network server 106 and cloud server 108 operate over a network such as, for example, the Internet, and are therefore connected via one or more network connections 112. It should be understood that, in some embodiments, the cloud server 108 may be a computer server or a collection of computer servers that comprise a component of the system 100 and is therefore operated by one or more administrators managing the components of the system (i.e., the first user node 102, second user node 104 and network server 106). In other embodiments, the cloud server 108 may be provided and/or operated by a third party.

The present disclosure provides a method for securely sharing data stored on the cloud server 108. An example of one such method is provided in the flow diagram 200 illustrated in FIG. 2, and is described with reference to the example system 100 provided in FIGS. 1A and 1B. The method provided in FIG. 2 assumes that a document 114 has been previously encrypted and stored on the cloud server 108 as an encrypted file 110. However, in some embodiments, the methods disclosed herein may further include the steps of generating the document 114 and encrypting the document to generate the encrypted file 110. The method provided in FIG. 2 also assumes that the first user 102A intends to share the document 114 with the second user 104A in a secure manner. Accordingly, the first user 102A may be referred to herein as a sender, sharer or sending user, and the second user 104A may be referred to herein as a recipient, receiving user or recipient user.

Figure 2:
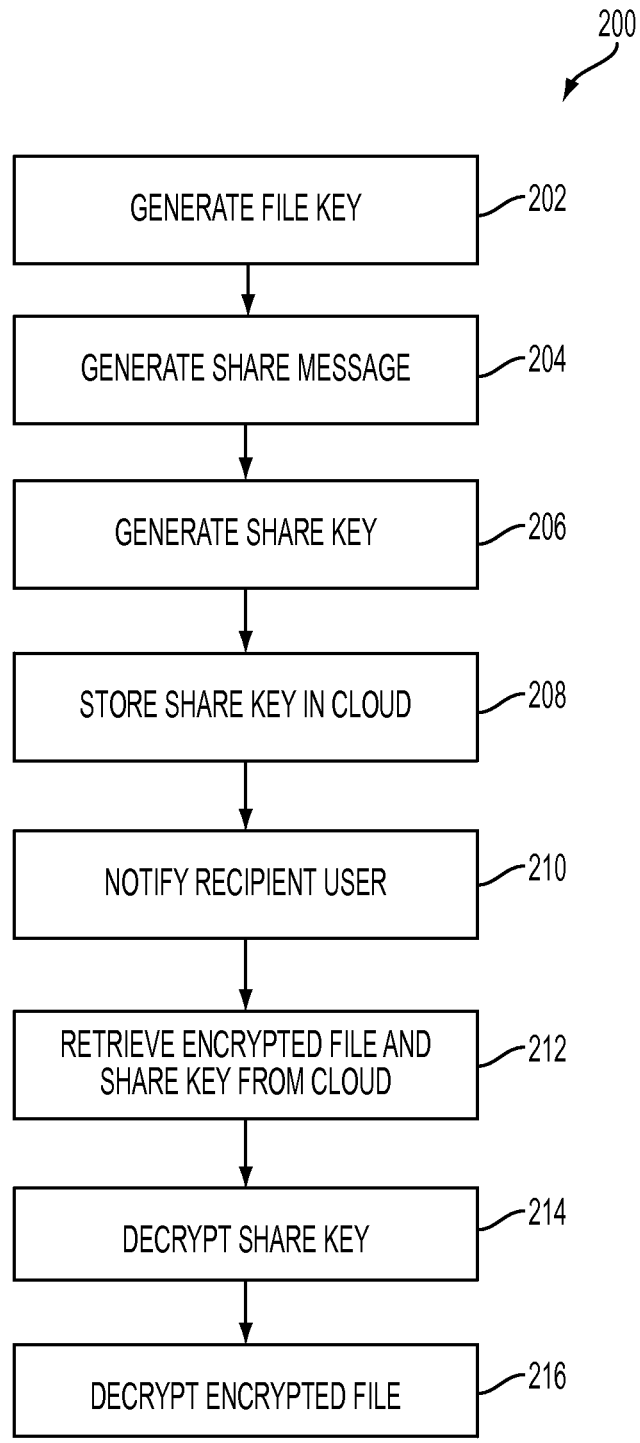
FIG. 2 is a flow diagram illustrating an embodiment of a method for sharing an encrypted file stored in a cloud server.

At block 202 of FIG. 2, a file key 124 is generated. The file key 124 is an encryption key used to decrypt the encrypted file 110 and, therefore, may be specific to the document 114 to be shared. In some embodiments, the file key 124 may be generated using the first user's private identification key 102C. In some embodiments, the file key 124 may be generated when the first user 102A indicates that the document 114 is to be shared with the second user 104A. It should be appreciated that, in some embodiments, the file key 124 generated at block 202 may be a symmetric key, or in other embodiments, may be a private key of an asymmetric key pair.

The first user 102A is capable of generating the file key 124 when desired. Therefore, it is not necessary for the first user 102A to store or retain the file key 124 for later use. For example, in some embodiments, the file key 124 may originally be used to encrypt the document 114 to generate the encrypted file 110. In such embodiments, the first user 102A generates the file key 124 to encrypt the document 114 to generate the encrypted file 110. After the encrypted file 110 is generated, the first user 102A does not need to retain or store the file key 124 for later use (for example, to decrypt the encrypted file 110) because the first user 102A is capable of regenerating the file key 124 as needed. In embodiments in which the file key comprises an asymmetric key system, the file key used to encrypt the document 114 may be a public key of an asymmetric key pair, and the file key 124 used to decrypt the encrypted file 110 may be a private key of the asymmetric key pair.

At block 204 of FIG. 2, a share message 126 is generated by the first user 102A and transmitted to the network server 106. The share message 126 may include one or more of the following: the file key 124, data 126A identifying the recipient user (i.e., the second user 104A) and data 126B identifying the file (i.e., document 114 or encrypted file 110) to be shared. The data 126A identifying the recipient user may, in some embodiments, include the second user identifier 104B or other information such as the recipient user's email address, user name, user identification number, or any other information used to identify the recipient user. In some embodiments, the share message 126 may be transmitted over a secure channel authenticated to the first user 102A. The share message 126 may be transmitted by any means known in the art including, for example, via email or by using a program operating on the first user device 116.

The network server 106 receives the share message 126 and, at block 206 of FIG. 2, generates a share key 128. The share key 128 is an encrypted version of the file key 124. When the share message 126 is received by the network server 106, its data, including the identification of the recipient user, is extracted from the share message 126 and used to generate the share key 128. For example, in some embodiments, the share key 128 is generated by encrypting the file key 124 (received via the share message 126), using the recipient user's identification key, which may be retrieved from the database 122 as further described below. In accordance with the embodiment illustrated in FIGS. 1A and 1B, the share key 128 is encrypted using the second user's identification key 104C.

In some embodiments, the recipient user's identification key may comprise either a symmetric key system or an asymmetric key system. In embodiments in which the recipient user's identification key comprises a symmetric key system, the recipient user's identification key is used to encrypt the file key 124, and is also used to decrypt the share key 128, as explained below. In embodiments in which the recipient user's identification key comprises an asymmetric key system, the identification key used to encrypt the file key 124 is a public key of an asymmetric key pair, and the key used to decrypt the share key 128 is a private key of the asymmetric key pair.

The database 122 maintains, in some embodiments, a table 122A of user identifiers and a table 122B of corresponding user identification keys. In some embodiments, when the network server 106 receives the identification of the recipient user (via the share message 126) the server 106 retrieves the appropriate user identifier (e.g., the second user identifier 104B) from the table 122A and the corresponding identification key (e.g., the second user's identification key 104C) from the table 122B. It should be appreciated that, in some embodiments, if the data 126B identifying the recipient user contains the recipient user's user identifier, the network server 106 retrieves the corresponding identification key without retrieving the user identifier from the database 122. This data may then be used to generate the share key 128 as described above.

Referring now to block 208 of FIG. 2, once the share key 128 is generated, it is stored on the cloud server 108. In some embodiments, the share key 128 may be assigned a dynamically-generated storage name. The dynamically-generated storage name may be randomly generated and serves to distinguish the share key 128 from other files stored on the cloud server 108. In some embodiments, the network server 106 may maintain an index record of the files stored on the cloud server 108, and their corresponding dynamically-generated storage names, so that a user associated with the system 100 and having proper permission may reference a specific file stored on the cloud server 108.

At block 210 of FIG. 2, the recipient user 104A is notified of the encrypted file 110 and share key 128 stored on the cloud server 108. In some embodiments, this may include the network server 106 sending a communication to the second user 104A, wherein the communication notifies the second user 104A that the share key 128 and encrypted file 110 are stored on the cloud server 108. In some embodiments, the communication may be by way of a text message, email, push notification, out-of-band transmissions or other ways known in the art.

At block 212 of FIG. 2, the second user 104A retrieves the encrypted file 110 and the share key 128 from the cloud server 108. After retrieving the encrypted file 110 and share key 128, the second user 104A decrypts the share key 128 at block 214 of FIG. 2. The second user's identification key 104C, which, in accordance with some embodiments, was used to encrypt the share key 128, is known to the second user 104A, and is used by the second user 104A to decrypt the share key 128. As discussed above, the second user's identification key 104C may comprise a symmetric key in some embodiments, and in other embodiments, may be a private key of an asymmetric key pair. By decrypting the share key 128, the second user 104A reconstructs the file key 124 that was used to encrypt the encrypted file 110. At block 216 of FIG. 2, the second user 104A uses the reconstructed file key 124 to decrypt the encrypted file 110 to obtain the original, unencrypted document 114.

The disclosed method for sharing an encrypted file stored in a cloud server provides various advantages and benefits. For example, the method disclosed herein does not require that users manage their own keys, as this is handled by the system 100 or, more particularly, by the network server 106. As a result, the disclosed method removes the need for additional key infrastructure because the method does not rely on public key infrastructure, but rather on a software architecture that is simpler to use and administrate. Additionally, the disclosed method provides a system for sharing encrypted information such that the identification key for the recipient user is not shared with other users or stored on the cloud server 108, thereby providing greater security.

A number of additional and alternative embodiments of the disclosed system and method may be provided without departing from the spirit or scope of the present disclosure as set forth in the claims provided herein. For example, in some embodiments, the disclosed method and system may be expanded to share more than one encrypted file stored in a cloud server with a user. In other embodiments, the disclosed method and system may be expanded to share one encrypted file stored in a cloud server with multiple users. In yet another embodiment, the disclosed method and system may be expanded to share various encrypted files stored in a cloud server with multiple various users. These various embodiments are believed to be understood by one of ordinary skill in the art in view of the present disclosure.

What is claimed is:

1. A computer-implemented method for sharing a digital file, wherein the digital file is stored in a cloud-based storage system, wherein the cloud-based storage system comprises a first user node operable by a sending user wherein the sending user is associated with a first user identifier and a first user private identification key known only to the first user node, wherein the cloud-based storage system also comprises a second user node operable by a receiving user associated with a second user identifier and a second user private identification key known only to the second user node, the method comprising:

encrypting, via a processor of the first user node and using a file key generated by the processor of the first user node, a first file wherein a first digitally encrypted file is created,
    wherein the file key is not retained by the first user node, storing, via the processor of the first user node, the first digitally encrypted file in a cloud server;

regenerating, via the processor of the first user node, the file key, in response to an instruction to share the first digitally encrypted file with the second user node,
    wherein the file key is usable to decrypt the first digitally encrypted file, generating, via the processor of the first user node, a share message, the share message including the generated file key and identifying at least the second user node and the first digitally encrypted file stored in the cloud server;

transmitting the share message from the processor of the first user node to a network server comprising a network server computer processor that is a component of the first user node and a network server memory that is a component of the second user node,
- wherein the network server processor and the network server memory are separate and disposed at different locations;

retrieving, from the network server memory that is a component of the second user node, a second user private identification key identified in the share message, wherein the network server memory contains a database comprising:
- the first user identifier and the first user private identification key; and
- the second user identifier and the second user private identification key, encrypting, via the network server computer processor the regenerated file key using the second user private identification key in the database contained in the network server memory to generate a share key;

transmitting the share key from the network server to the cloud server to store the share key in the cloud server, wherein the share key is stored in the cloud server with a random dynamically-generated storage name, maintaining, by the network server memory, an index record of share keys and random dynamically-generated storage names associated with the share keys;

notifying, by the network server computer processor, the second user node of at least one of the first digitally encrypted file and the random dynamically-generated storage name stored in the cloud server;

retrieving, via a processor of the second user node, the digitally encrypted file and the share key from the cloud server by accessing the random dynamically-generated storage name;

generating, via the processor of the second user node, the second user private identification key;

decrypting, via the processor of the second user node, the share key using the second user private identification key to reconstruct the file key known only to the first user node; and decrypting, via the processor of the second user node, the first digitally encrypted file using the reconstructed file key.

2. The computer-implemented method of claim 1, wherein the private identification key of the recipient user is a symmetric key.

3. The computer-implemented method of claim 1, wherein the file key is a symmetric key.

4. The computer-implemented method of claim 1, wherein the file key is an asymmetric key.

5. The computer-implemented method of claim 1, wherein generating the share message includes the first user node identifying the second user node to receive a decrypted version of the first digitally encrypted file.

6. The computer-implemented method of claim 1, wherein the second user private identification key used to encrypt the file key is a public key of an asymmetric key pair.

7. The computer-implemented method of claim 1, wherein the second user private identification key used to decrypt the share key is a private key of an asymmetric key pair.

8. One or more non-transitory computer-readable media embodied with computer-executable instructions that, when executed by one or more processors, perform a computer-implemented method for sharing a digital file, wherein the digital file is stored in a cloud-based storage system, wherein the cloud-based storage system comprises a first user node operable by a sending user wherein the sending user is associated with a first user identifier and a first user private identification key known only to the first user node, wherein the cloud-based storage system also comprises a second user node operable by a receiving user associated with a second user identifier and a second user private identification key known only to the second user node, the method comprising:

encrypting, via a processor of the first user node and using a file key generated by the processor of the first user node, a first file wherein a first digitally encrypted file is created,
- wherein the file key is not retained by the first user node, storing, via the processor of the first user node, the first digitally encrypted file in a cloud server;

regenerating, via the processor of the first user node, the file key, in response to an instruction to share the first digitally encrypted file with the second user node,
- wherein the file key is usable to decrypt the first digitally encrypted file, generating, via the processor of the first user node, a share message, the share message including the generated file key and identifying at least the second user node and the first digitally encrypted file stored in the cloud server;

transmitting the share message from the processor of the first user node to a network server comprising a network server computer processor that is a component of the first user node and a network server memory that is a component of the second user node,
- wherein the network server processor and the network server memory are separate and disposed at different locations;

retrieving, from the network server memory that is a component of the second user node, a second user private identification key identified in the share message, wherein the network server memory contains a database comprising:
- the first user identifier and the first user private identification key; and
- the second user identifier and the second user private identification key, encrypting, via the network server computer processor, the regenerated file key using the second user private identification key in the database contained in the network server memory to generate a share key;

transmitting the share key from the network server to the cloud server to store the share key in the cloud server, wherein the share key is stored in the cloud server with a random dynamically-generated storage name, maintaining, by the network server memory, an index record of share keys and random dynamically-generated storage names associated with the share keys;

notifying, by the network server computer processor, the second user node of at least one of the first digitally encrypted file and the random dynamically-generated storage name stored in the cloud server;

retrieving, via a processor of the second user node, the digitally encrypted file and the share key from the cloud server by accessing the random dynamically-generated storage name;

generating, via the processor of the second user node, the second user private identification key;

decrypting, via the processor of the second user node, the share key using the second user private identification key to reconstruct the file key known only to the first user node; and decrypting, via the processor of the second user node, the first digitally encrypted file using the reconstructed file key.

9. The one or more non-transitory computer-readable media of claim 8, wherein the second node private identification key is a symmetric key.

10. The one or more non-transitory computer-readable media of claim 8, wherein the second user private identification key used to encrypt the file key is a public key of an asymmetric key pair.

11. The one or more non-transitory computer-readable media of claim 8, wherein the file key.

12. A cloud based storage system comprising:
a first user node operable by a sending user, and comprising a first user node processor,
wherein the sending user is associated with a first user identifier and a first user private identification key,
wherein the user private identification key is known only to the first user node;
a second user node operable by a receiving user, and comprising a second user node processor,
wherein the receiving user is associated with a second user identifier and a second user private identification key,
wherein the second user private identification key is known only to the second user node; and
a network server comprising:
a network server computer processor that is a component of the first user node;
a network server non-transitory memory that is a component of the second user node and comprises:
a database comprising:
the first user identifier and the first user private identification key; and
the second user identifier and the second user private identification key;
an index record comprising:
a share key; and
a random dynamically-generated storage name associated with the share key, wherein the network server computer processor and the network server non-transitory memory are separate and disposed at different locations, wherein the first user node, the second user node are configured to access a cloud server having a first encrypted file stored therein by the first user, wherein the first user node processor is configured to generate a file key and encrypt a first file with the file key wherein a first digitally encrypted file is created, wherein the first user node does not retain the file key, wherein the first user node processor stores the first digitally encrypted file in a cloud server, wherein the first user node processor regenerates the file key in response to an instruction to share the first digitally encrypted file with the second user node, wherein the first user node processor generates a share message comprising the regenerated file key and identifying at least the second user node and the first digitally encrypted file stored in the cloud server, wherein the first user node processor transmits the share message to a network server, wherein the network server computer processor that is a component of the first user node is operable to encrypt the regenerated file key using the second user private identification key in the database contained in the network server memory to generate a share key, wherein the network server transmits the share key to the cloud server to store the share key in the cloud server with the random dynamically-generated storage name, wherein the network server computer processor notifies the second user node of at least one of the first digitally encrypted file and the random dynamically-generated storage name stored in the cloud server, wherein the second user node processor accesses the random dynamically-generated storage name and retrieves the digitally encrypted file and the share key from the cloud server, wherein the second user node processor generates the second user private identification key, wherein the second user node processor decrypts the share key using the second user private identification key and reconstructs the file key known only to the first user node, and wherein the second user node processor decrypts the first digitally encrypted file using the reconstructed file key.

* * * * *